May 1, 1923.
G. FOLL
ATTACHMENT TO GAS STOVES
Filed March 13, 1922
1,453,665
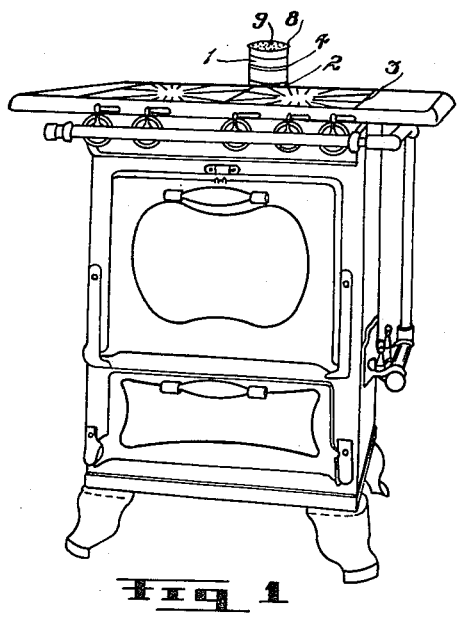
Fig. 1
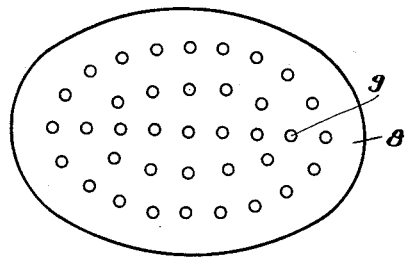
Fig. 2
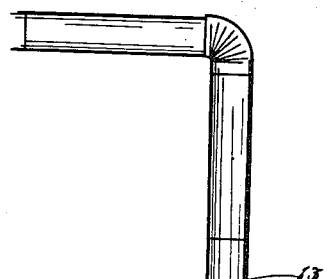
Fig. 4
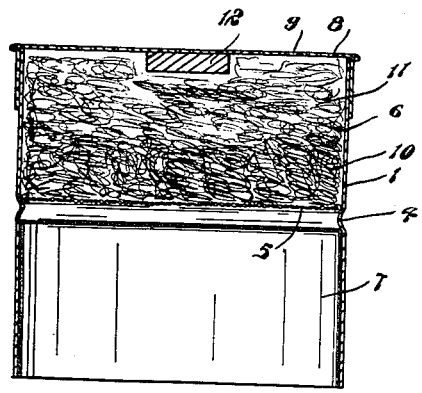
Fig. 3
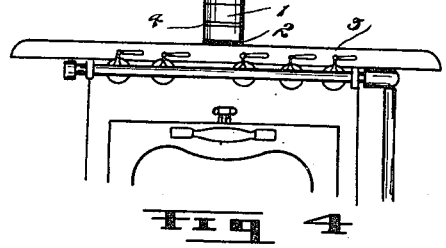
INVENTOR
G. Foll
BY
ATTYS Patented May 1, 1923.

1,453,665

UNITED STATES PATENT OFFICE.

GERALD FOLL, OF WINNIPEG, MANITOBA, CANADA.

ATTACHMENT TO GAS STOVES.

Application filed March 13, 1922. Serial No. 543,451.

*To all whom it may concern:*

Be it known that I, GERALD FOLL, a subject of the King of Great Britain, and a resident of the city of Winnipeg, in the Province of Manitoba, Canada, have invented certain new and useful Improvements in Attachments to Gas Stoves, of which the following is the specification.

An object of the invention is to provide a device readily attachable to the oven outlet of a gas stove which will collect and deodorize the gas, cooking fumes and greasy vapors arising from the oven and which will also retard the escape of heat from the oven and thereby effect a considerable saving of gas.

A further object of the invention is to construct the device in a simple, cheap and durable manner and so that it can be readily detached and opened for cleaning and renewing purposes.

With the above objects in view the invention consists essentially in the arrangement and construction of parts hereinafter more particularly described and later pointed out in the appended claims, reference being had to the accompanying drawing in which:—

Fig. 1 is a perspective view of a gas stove with my device attached.

Fig. 2 is a plan view of the device.

Fig. 3 is a vertical sectional view centrally through the device.

Fig. 4 is a view showing a modified construction of the appliance.

In the drawing like characters of reference indicate corresponding parts in the several figures.

I have found that in a great many instancs gas stoves are used without any pipe or flue connecting the oven with a chimney, and this results in the distributing in the room of disagreeable, greasy, cooking and gas fumes and the dirtying of the room walls by deposit of grease and such like. Further, with and without flues, there is a considerable amount of heat lost, such escaping out the flue outlet and this results in a direct loss in gas to maintain the oven at the proper cooking temperature.

The device which I have invented obviates the above mentioned troubles and can be utilized to advantage with or without a flue or outlet pipe.

Referring to the drawing, wherein the device is shown, it will be observed that it comprises an oval casing or body part 1 adapted to fit over the collar 2 leading from the oven of the stove 3, the said casing being preferably made from stove piping and expanded at the lower end to ensure of easy attachment. Centrally of its length the casing is provided with a circumscribing rib 4 which supports an open wire grid 5, inserted from the top and dividing the interior of the casing into an upper compartment 6 and a lower compartment 7.

The upper end of the casing is closed by a removable top or cap 8 which is perforated at 9 to allow the purified vapors to escape.

In the upper compartment and resting on the grid I place a quantity of steel wool 10, immediately above which I put a layer of combed asbestos 11, the two materials practically filling the chamber. A cake of black carbon 12 rests on the asbestos and acts as a complete deodorizer.

Where no flue pipe is used the device is attached directly to the oven outlet collar 2 as best shown in Fig. 1 of the drawing. The oven fumes, gas and vapors are broken up and distributed by the steel wool and the moisture, grease and such like are absorbed by the asbestos. The remaining gas and fumes are deodorized by the carbon. It is also to be noted that the asbestos and steel wool have the effect of retarding the escape of heat from the oven by way of the outlet collar. This effects a considerable saving in the gas used by the stove.

In Figure 4 I have shown the device installed between the collar 2 and a flue pipe 13. In this case the cap 8 is removed and the pipe fitted on instead. Obviously one can remove and renew the contents of the casing from time to time as occasion demands.

What I claim as my invention is:—

1. An attachment to the oven outlet collar of a gas stove comprising an extending casing fitting the collar, a layer of steel wool suspended within the casing, a layer of asbestos above the wool and a deodorizing material.

2. An attachment to the oven outlet collar of a gas stove comprising an extending casing fitting the collar and provided with a centrally positioned circumscribing rib, a perforated cap closing the upper end of the casing, an open grid suported by the rib, a layer of steel wool supported by the grid, a layer of asbestos above the wool and a piece of carbon lying on the asbestos.

3. The combination with a stove provided with an outlet opening surrounded by an upwardly extended collar of a removable tubular casing having its lower end fitted over the said collar, a perforated cap closing the upper end of the casing, a perforated grid supported in the casing below the cover and above the collar and heat retaining and deodorizing material confined between the cover and the grid and supported on the latter.

Signed at Winnipeg, this 14 day of December, 1921.

GERALD FOLL.

In the presence of:
GERALD S. ROXBURGH,
M. B. KELLEHER.